(12) United States Patent
Benari et al.

(10) Patent No.: US 11,435,995 B2
(45) Date of Patent: Sep. 6, 2022

(54) COMPOSITE CONTENT VIEWS

(71) Applicant: Red Hat Israel, Ltd., Raanana (IL)

(72) Inventors: Amos Benari, Yokneam Hamoshava (IL); Ohad Levy, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 98 days.

(21) Appl. No.: 14/537,456

(22) Filed: Nov. 10, 2014

(65) Prior Publication Data

US 2015/0347111 A1 Dec. 3, 2015

Related U.S. Application Data

(60) Provisional application No. 62/006,753, filed on Jun. 2, 2014.

(51) Int. Cl.
*G06F 8/61* (2018.01)
*G06F 11/36* (2006.01)

(52) U.S. Cl.
CPC .............. *G06F 8/63* (2013.01); *G06F 11/3664* (2013.01)

(58) Field of Classification Search
CPC .......................... G06F 11/1435; H04L 41/082
USPC ........................................................ 715/736
See application file for complete search history.

(56) References Cited

U.S. PATENT DOCUMENTS

| 7,346,623 B2 * | 3/2008 | Prahlad ............... G06F 11/1435 |
| 7,870,075 B1 | 1/2011 | Sabet |
| 8,341,345 B2 | 12/2012 | Tulskie et al. |
| 8,392,464 B2 | 3/2013 | Bloesch et al. |
| 8,656,343 B2 | 2/2014 | Fox et al. |
| 2012/0240048 A1 * | 9/2012 | Fortier .................. H04L 41/082 715/736 |
| 2013/0024475 A1 | 1/2013 | Sappey et al. |
| 2014/0101109 A1 * | 4/2014 | Gnech ................. G06F 11/1448 707/652 |

OTHER PUBLICATIONS

No Author, "Content Views," Katello, [retrieved Nov. 12, 2014], Jan. 16, 2014, 10 pages, Internet: <https://fedorahosted.org/katello/wiki/ContentViews>.

Eric Helms et al., "Katello Content as a Foreman Engine Workflow," Google Groups, [retrieved Nov. 12, 2014], Jul. 24-25 and 29, 2013, 30 pages, Internet: <https://groups.google.com/forum/#!topic/foreman-dev/3hCLPUu41JM>.

Jeremy Heiler et al., "How do you Keep Released Binaries under Version Control?" Release Management, Programmers Stack Exchange, [retrieved Nov. 12, 2015], Jun. 7, 2012, 3 pages, Internet: <http://programmers.stackexchange.com/questions/151865/how-do-you-keep-released-binaries-under-version-control>.

Sunghun Kim et al., "TA-RE: An Exchange Language for Mining Software Repositories," MSR '06, [retrieved Nov. 12, 2014], May 22-23, 2006, 5 pages, Internet: <http://scg.unibe.ch/archive/papers/Kim06aTARE.pdf>.

(Continued)

*Primary Examiner* — Andrey Belousov

(74) *Attorney, Agent, or Firm* — Womble Bond Dickinson (US) LLP

(57) ABSTRACT

A configuration management system provides a web user interface that allows a user to instruct the configuration management system to load content into an environment, take a snapshot of the environment, and store the snapshot in a snapshot library. The configuration management provides access to the snapshot library via the web user interface.

15 Claims, 6 Drawing Sheets

(56) References Cited

OTHER PUBLICATIONS

Deanna Burke et al., "Managing Repository Content," Oracle, [retrieved Nov. 12, 2014], Mar. 2007, 294 pages, Internet: <http://docs.oracle.com/cd/E10316_01/cs/cs_doc_10/documentation/admin/managing_content_10en.pdf>.

No Author, "Welcome to the Docker User Guide," Docker, Inc., [retrieved May 13, 2015], 2014-2015, 3 pages, Internet: <http://docs.docker.com/userguide/>.

No Author, "Layers," Docker Documentation, retrieved Nov. 12, 2014, 2 pages, Internet: <https://docs.docker.com/terms/layer/>.

\* cited by examiner

COMPOSITE CONTENT VIEWS

CROSS-REFERENCE TO RELATED APPLICATIONS

This application claims priority to U.S. Provisional Patent App. No. 62/006,753, filed Jun. 2, 2014, which is hereby incorporated by reference in its entirety.

TECHNICAL FIELD

Aspects of the present disclosure relate to installation of software from repositories.

DESCRIPTION OF THE RELATED ART

A user, such as a systems administrator of an IT department, may be responsible for the configuration management of a number of client machines, e.g. responsible for installing software on the client machines and keeping the client machine up-to-date and bug-free.

BRIEF DESCRIPTION OF THE DRAWINGS

Aspects of the present disclosure are illustrated by way of example, and not by way of limitation, and can be more fully understood with reference to the following detailed description when considered in connection with the figures in which.

DETAILED DESCRIPTION

Figure 1:
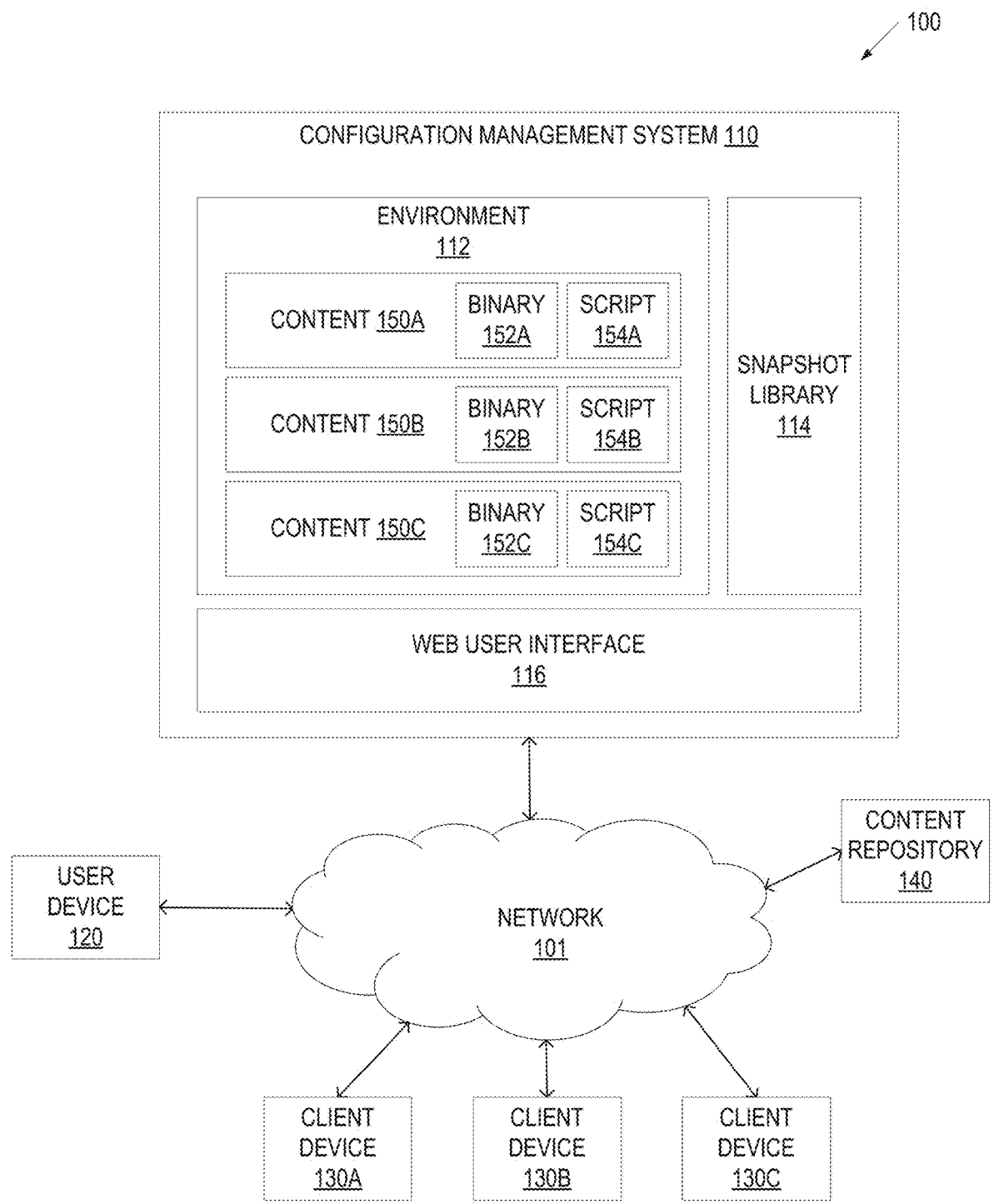
FIG. 1 is a block diagram of an example network architecture in which implementations of the present disclosure can operate.

A user, such as systems administrator of an IT department responsible for configuration management of a number of client machines, may control the software that is installed on the client machines. Such software may be installed from remote repositories or other sources. However, such control and management may be difficult as a constant stream of updates are released by software providers. Some management systems may only allow a single instance of a product within an environment assigned to a client machine. Described herein in a web user interface that provides a management system to snapshot environments (e.g., before or after each software update) so that previous conditions can be easily recreated for debugging or other purposes.

A web user interface is provided that allows a user, such as a systems administrator of an IT department responsible for the configuration management of a number of client machines, to migrate content from remote repositories, local directories, and ISOs into a container called an environment that may refer to a collection of software that would facilitate an effective operation of a client machine (e.g., in a data center, network, etc.). The user may assign client machines to the environment resulting in the client machines being configured to include the content of the environment. The content may include, for example, one or more of an operating system, a framework for executing applications (e.g., Java Application Server or Java JBoss), or an application. The content may include one or more program binaries and one or more scripts that configure the programs for execution. For example, an operating system content may include at least one of a base operating system, an operating system update, a security patch, etc. The operating system content may further include a script for installing at least one of the base operating system, the update, or the patch.

The web user interface may allow a user to populate the environment by selecting a content from each of plurality of hierarchical layers, wherein each hierarchical layer is allocated different responsibilities for the execution of an application. For example, the user may select an operating system content from one or more operating system contents for installing an operating system, select a framework content from one or more framework contents for installing a framework that runs an application, and selecting an application content from one or more application contents for installation of an application. Thus, the user may mix and match the available contents to create his or her own hierarchy. In addition to, or alternatively to, a web user interface, a command line interface (CLI) or an application programming interface (API), may be used to populate the environment or perform other functions of the web user interface described below.

In one aspect, an environment may only maintain a single instance of a product, such as an operating system, framework, or application. However, a user may use the web user interface to generate snapshots of an environment (including the content of the environment) at various points in time. Each snapshot may be a file that represents a copy of the environment (including the content contained in the environment) corresponding to a specific point in time. The snapshots may be stored in a snapshot library accessible via the web user interface. The web user interface may allow the user to search or filter the snapshot library. For example, a user may search for snapshots having content from a particular date or content associated with a particular version identifier. The web user interface may allow the user access to that content to, e.g., allow continuous delivery (CD) of software, including, but not limited to, running one or more tests of the software or performing other validations of the software.

As noted above, the content may include a program binary and the script that configures the program for execution. For example, the content may include a binary of a software component and a script for installing the software component onto a client machine. Thus, a program binary from a software vendor may be combined with configuration management directives (e.g., installation instructions and/or preferences) that can be used to reproduce the application at any point in time a snapshot is taken, allowing definitive recreation of a past installation. Thus the web user interface allows a user to generate different sets of the same products which can be filtered based on user preferences.

FIG. 1 is a block diagram of a network architecture 100. The network architecture 100 includes a configuration management system 110 coupled to and accessible over a network 101 by a user device 120 via a web user interface 116. The configuration management system 110 is also coupled to a number of client devices 130A-130C via the network 101. The configuration management system may also be coupled to at least one content repository 140, either directly or via the network 101.

A user of the user device 120 may use the web user interface to migrate content 150A-150C into an environment 112 defined by the configuration management system 110. The environment 112 may be defined by the configuration management system 110 as a container file that stores the content 150A-150C or links to the content 150A-150C. The content 150A-150C may be retrieved from a content repository 140 or provided by the user device 120. The environment 112 may further include a list or table of client devices associated with the environment 112. For example, the user may assign one or more of the client devices 130A-130C to the environment 112 resulting in the configuration management system 110 pushing the content 150A-150C to the assigned client device(s). Thus, the user may indirectly and more easily manage the software configuration of one or more of the client devices 130A-130C.

The content 150A-150C may include, for example, one or more of an operating system, a framework for executing application, or an application. In one aspect, the content 150A-150C includes all data required to run the application end-to-end. For example, each content 150A-150C may include a program binary 152A-152C and a script 154A-154C that configures that content for execution. The scripts 154A-154C may include, for example, an installer or configuration management directives. As a particular example, a content may include a base program, an update to the program, and a script for installing the program.

The web user interface 116 may allow a user to populate the environment by selecting a content 150A-150C from each of plurality of groups arranged in a hierarchy. For example, the user may select a first content 150A as an operating system content from one or more operating system contents for installing an operating system, select a second content 150B as framework content from one or more framework contents associated with the selected operating system content for installing a framework that runs an application, and selecting a third content 150C as an application content from one or more application contents associated with the selected operating system or framework for installation of an application.

Figure 2:
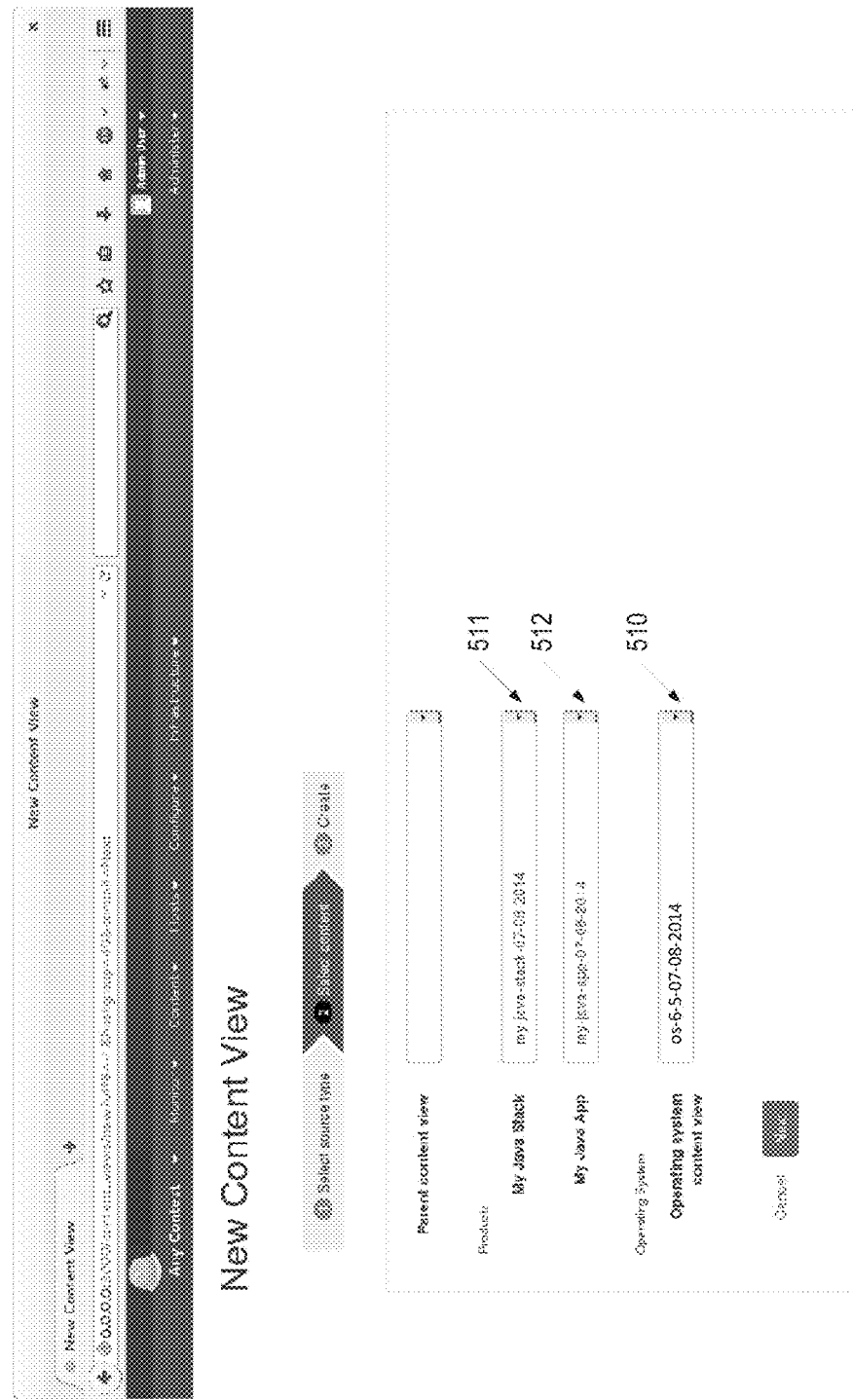
FIG. 2 is an example screenshot of a portion of a web user interface which may allow a user to populate an environment.

FIG. 2 illustrates a portion of an example web user interface which may allow a user to populate an environment, in accordance with some aspects of the disclosure. The user may select an operating system content for the environment from an operating system dropdown box 510. The user may also select one or more products for the environment, such as a framework content for running an application from a stack dropdown box 511 and an application content from an application dropdown box 512.

In one aspect, the environment 112 may only maintain a single instance of a product, such as an operating system, framework, or application. However, a user may use the web user interface 116 to request that snapshots of the environment 112 (including the content 150A-150C of the environment) be generated at various points in time. The snapshots may be stored in a snapshot library 114 accessible via the web user interface 116. The web user interface 116 may allow the user to search or filter the snapshot library 114. For example, a user may search for snapshots having content from a particular date or content associated with a particular version identifier of at least a portion of the content. The web user interface may allow the user access to the snapshot (including the content 150A-150C) to, e.g., perform one or more tests of the environment at the time the snapshot was taken.

Figure 3:
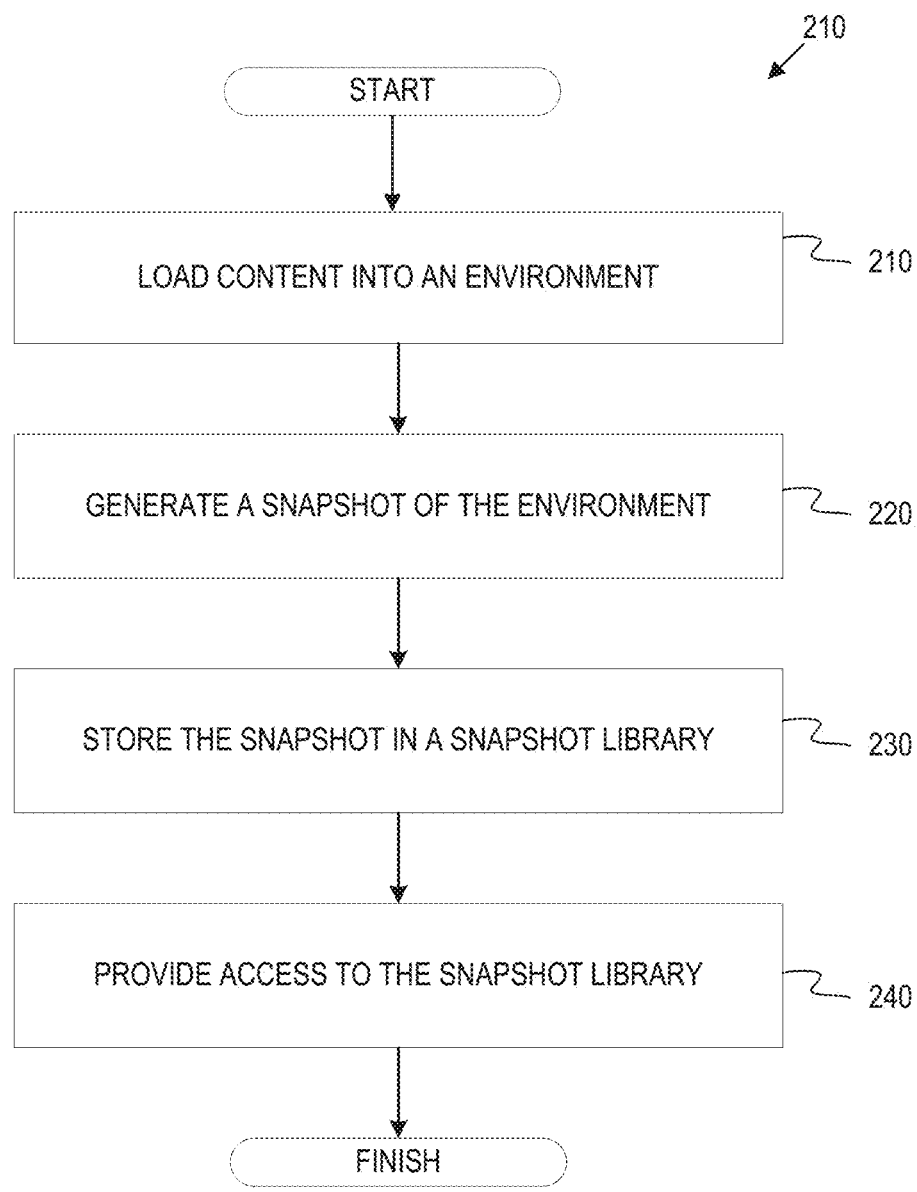
FIG. 3 is a flow diagram of a method of providing access to a snapshot library, in accordance with some aspects of the present disclosure.

FIG. 3 is a flow diagram of a method 200 of providing access to a snapshot library. The method 200 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. For example, the method 200 may be performed, in part, by processing logic of the configuration management system 110 described above with respect to FIG. 1.

It is to be appreciated that the method 200 may be performed by an engine for any number of snapshots. However, for ease of reference, the method 200 is described for a single snapshot.

At block 210 of method 200, the processing logic loads content into an environment. The content may be loaded into the environment in response to a request to load the content into the environment received from a user via a web user interface. The content may include, for example, one or more of an operating system, a framework for executing applications, or an application. The content may include one or more program binaries and one or more scripts that configure the programs for execution. The content may include other types of data. The content may be loaded into the environment as described below with respect to FIG. 4.

At block 220, the processing logic generates a snapshot of the environment. The snapshot may be generated in response to a request to generate the snapshot received from a user via a web interface. The snapshot may also be generated, automatically, in response to the content being loaded into the environment. A snapshot of the environment may be generated periodically or in response to a change in the environment. The snapshot may be generated in response to other conditions.

The snapshot may include the content loaded into the environment. The snapshot may also include metadata regarding the content loaded into the environment, such as a name identifying at least a portion of the content or version number associated with at least a portion of the content. The snapshot may also include metadata regarding the snapshot, such as when it was generated or what triggered the generation of the snapshot. The snapshot may include other data.

At block 230, the processing logic stores the snapshot in a snapshot library. The snapshot library may store a plurality of snapshots taken at different times.

At block 240, the processing logic provides access to the snapshot library. The processing logic may provide access to the snapshot library via the web user interface. In one aspect, providing access to the snapshot library includes allowing a user to download snapshots from the snapshot library. In another aspect, providing access to the snapshot library includes allowing a user to load the snapshot into the environment, replacing the data of the environment with that of the snapshot. For example, the web user interface may allow a user to select a snapshot of a past environment and to instruct the processing logic to overwrite the current environment with the past environment.

Providing access to the snapshot library may include providing a search functionality that allows a user to search for snapshots meeting provided criteria (e.g., taken on a particular date or including particular content). Providing access to the snapshot library may also include providing a filtering functionality that sorts the snapshots by provided criteria (e.g., by date or by version number).

Figure 4:
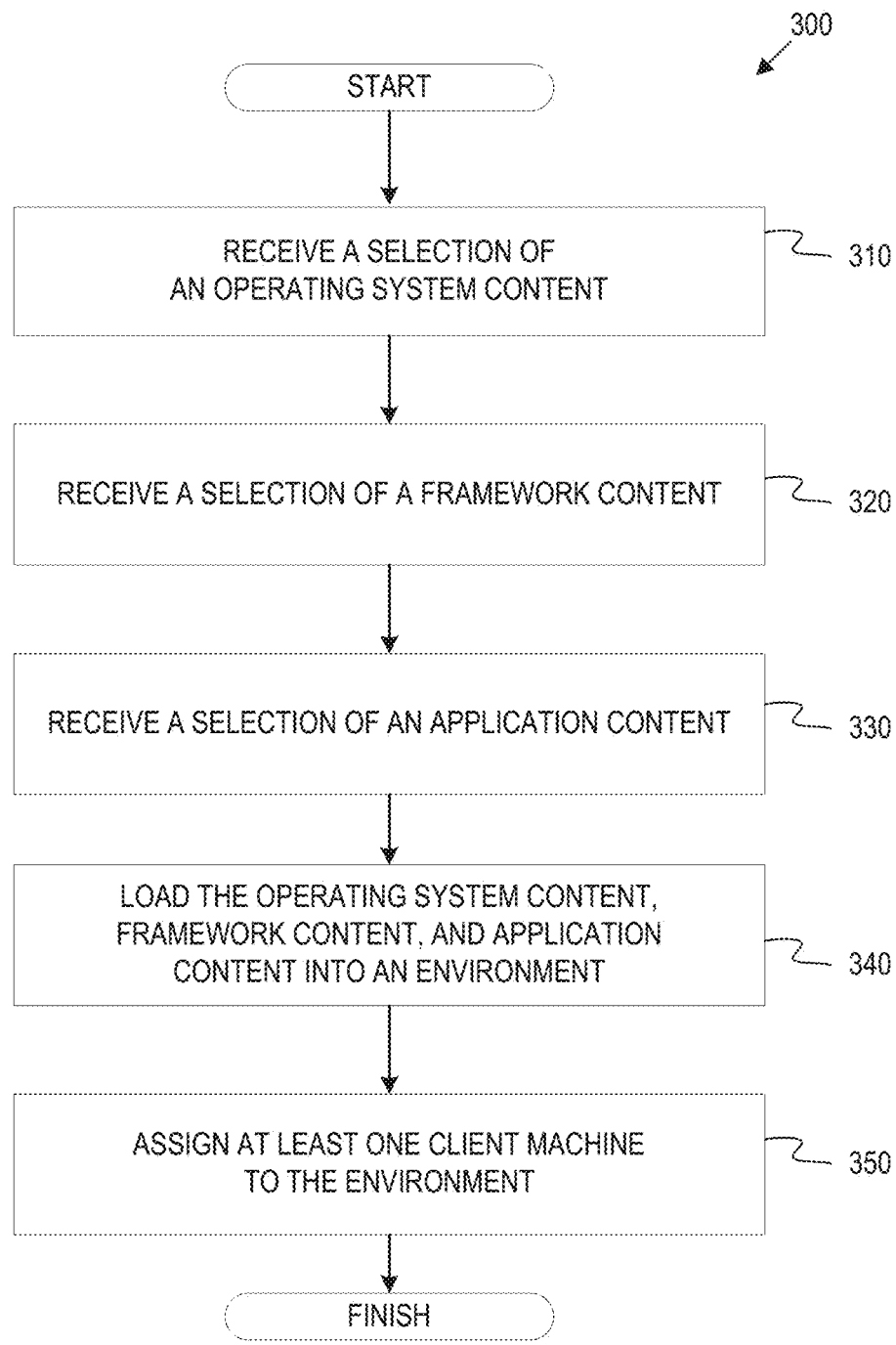
FIG. 4 is a flow diagram of a method of loading content into an environment, in accordance with some aspects of the present disclosure.

FIG. 4 is a flow diagram of a method 300 of loading content into an environment. The method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. For example, the method 300 may be performed, in part, by processing logic of the configuration management system 110 described above with respect to FIG. 1.

At block 310 of method 300, the processing logic receives a selection of an operating system content. The processing logic may receive the selection of the operating system content from a user via a web user interface, e.g., as illustrated in FIG. 2. In one aspect, the web user interface provides one or more operating system contents from which a user may select the operating system content. Different operating system contents may correspond to different operating systems or different versions of the same operating system. The operating system content may include a binary and a script for installing the operating system. The operating system content may include, for example, at least one of an operating system, updates to the operating system, and a script that installs the operating system.

At block 320, the processing logic receives a selection of a framework content. The processing logic may receive the selection of the framework content from a user via a web user interface, e.g., as illustrated in FIG. 2. In one aspect, the web user interface provides one or more framework contents from which a user may select the framework content. In one example, the provided one or more framework contents are based on the selected operating system content. Different framework contents may correspond to different frameworks for running applications or to different versions of the same framework for running applications. The framework content may include a binary and a script for installing the framework.

At block 330, the processing logic receives a selection of an application content. The processing logic may receive the selection of the application content from a user via a web user interface, e.g., as illustrated in FIG. 2. In one aspect, the web user interface provides one or more application contents from which a user may select the application content. In one example, the provided application contents are based on the selected operating system content and/or the selected framework content. Different application contents may correspond to different applications or to different versions of the same application. In one example, the processing logic receives a selection or more than one application content corresponding to more than one application.

At block 340, the processing logic loads the operating system content, the framework content, and the application content into an environment. The processing logic may define an immutable object (referred to as a content view) that contains the operating system content, the framework content, and the application content. The processing logic may load the content view into the environment. The environment may be a container file, and the processing logic may load the content into the environment by copying the content (or links to the content) into the container file.

At block 350, the processing logic assigns at least one client machine to the environment. The client machine may be assigned to the environment in response to instructions provided by a user via a web user interface. As described above, if a client machine is assigned to the environment, the processing logic may push the content of the environment to the client machine, thereby installing the operating system, framework, and application on the client machine.

Figure 5:
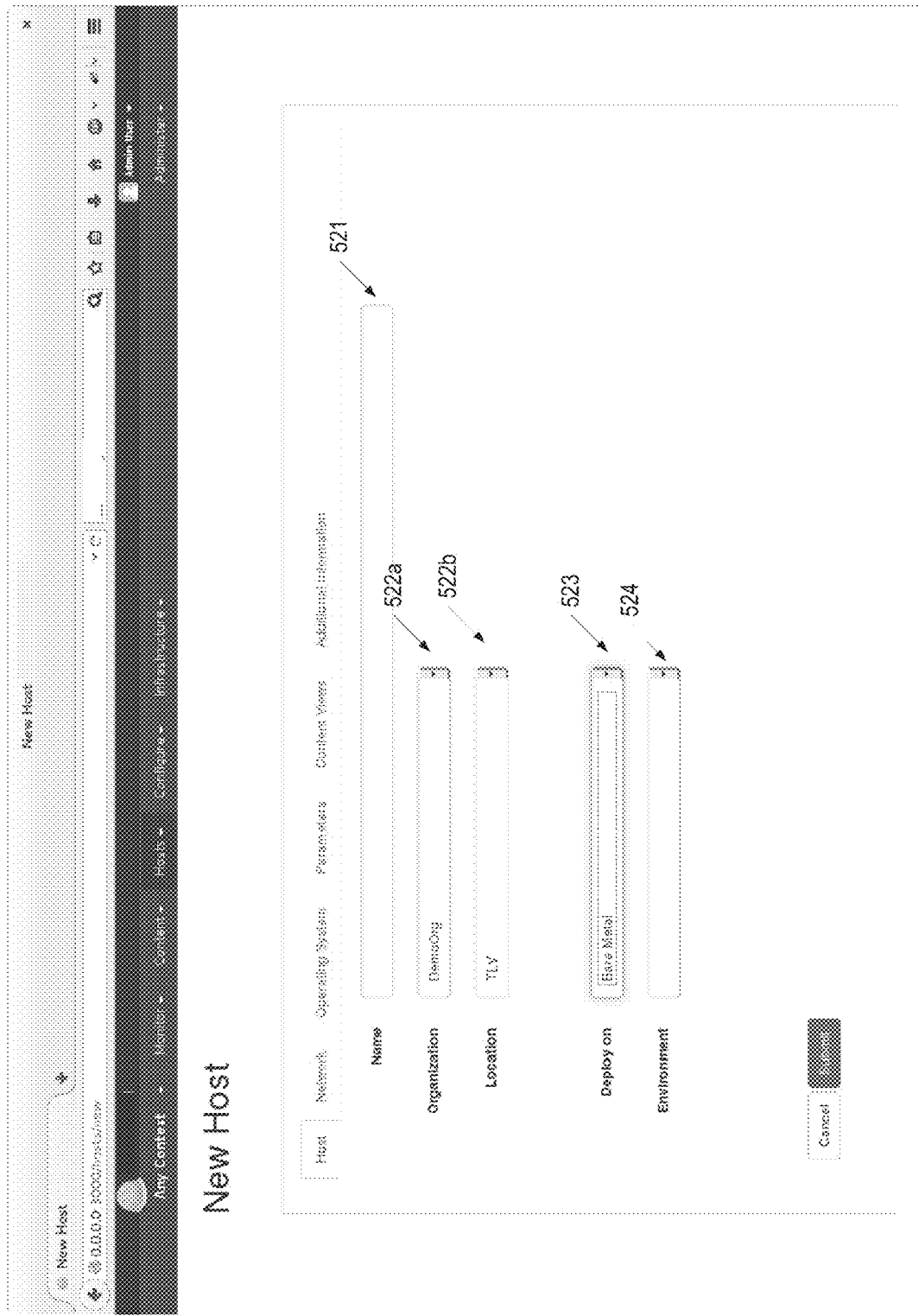
FIG. 5 is an example screenshot of a portion of a web user interface which may allow a user to define a host for deploying an environment to a group of client machines.

FIG. 5 is an example screenshot of a portion of a web user interface which may allow a user to define a host for deploying an environment to a group of client machines. The user may provide a name for the host in a name field 521. Using dropdown menus 522a and 522b, the user may select one or more client machines for deployment of the environment. For example, the dropdown menus may include an organization dropdown menu 522a allowing the selection of a group of client machines associated with an organization and may further include a location dropdown menu 522b allowing selection of a subset of those client machines located at a particular place.

The web user interface may include a deployment option dropdown menu 523 allowing the selection of a deployment option, e.g., to deploy the environment on bare metal or using an existing guest operating system. The web user interface may include an environment dropdown menu 524 allowing the selection of an environment to be deployed to the selected client machines.

Figure 6:
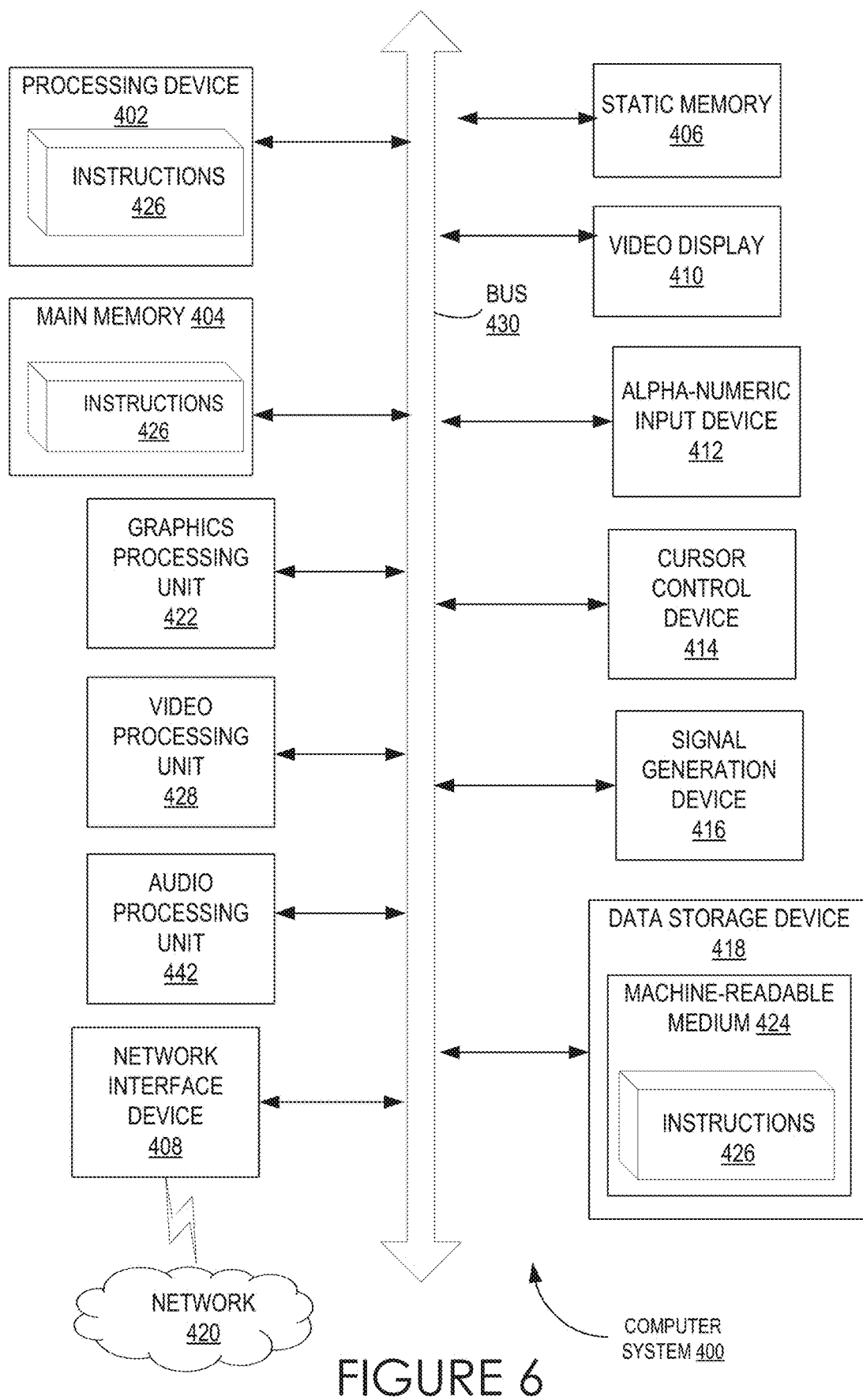
FIG. 6 illustrates a diagrammatic representation of a machine in the exemplary form of a computer system.

FIG. 6 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, the computer system 400 corresponds to the configuration management system 110 of FIG. 1. The computer system 400 may also correspond to the user device 120 or one of the client devices 130A-130C of FIG. 1.

The computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. In one aspect, processing device 402 may include one or processing cores. The processing device 402 is configured to execute the instructions 426 of processing logic for performing the operations discussed herein.

The computer system 400 may further include a network interface device 408 communicably coupled to a network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a signal generation device 416 (e.g., a speaker), or other peripheral devices. Furthermore, computer system 400 may include a graphics processing unit 422, a video processing unit 428, and an audio processing unit 432. In another implementation, the computer system 400 may include a chipset (not illustrated), which refers to a group of integrated circuits, or chips, that are designed to work with the processing device 402 and controls communications between the processing device 402 and external devices. For example, the chipset may be a set of chips on a motherboard that links the processing device 402 to very high-speed devices, such as main memory 404 and graphic controllers, as well as linking the processing device 402 to lower-speed peripheral buses of peripherals, such as USB, PCI or ISA buses.

The data storage device 418 may include a computer-readable storage medium 424 on which is stored instructions 426 embodying any one or more of the methodologies of functions described herein. The instructions 426 may also reside, completely or at least partially, within the main memory 404 and/or within the processing device 402 during execution thereof by the computer system 400; the main memory 404 and the processing device 402 also constituting computer-readable storage media.

The computer-readable storage medium 424 may also be used to store instructions 426 utilized by the engine 107, such as described with respect to FIG. 1, and/or a software library containing methods that call the above applications. While the computer-readable storage medium 424 is shown in an example embodiment to be a single medium, the term "computer-readable storage medium" or, simply, "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "forwarding", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other implementations will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of any future presented claims. Accordingly, the specification and drawings are to be regarded in an illustrative sense rather than a restrictive sense. The scope of the invention should, therefore, be determined with reference to any future claims, along with the full scope of equivalents to which such claims are entitled.

What is claimed is:

1. A method, comprising:
   receiving a selection of an operating system content from one or more operating system contents from a user via a web user interface;
   receiving a selection of a framework content from one or more framework contents;

receiving a selection of an application content from one or more applications;

loading a plurality of content into an environment wherein the plurality of content comprises the operating system content, the framework content, and the application content, wherein a server of a configuration management system comprising the environment, one or more client machines assigned to the environment, and each of the plurality of content comprising a binary of an operating system component and a script for installing the operating system component onto at least one of the one or more client machines assigned to the environment;

generating, by a processing device, a snapshot of the environment in response to loading the plurality of content into the environment;

storing the snapshot in a snapshot library;

providing access to the snapshot library;

receiving a selection of the snapshot from a plurality of snapshots of the snapshot library; and in response to receiving the selection, performing a test of the environment using the operating system component in view of the selected snapshot.

2. The method of claim 1, wherein the plurality of content comprises at least one of a second operating system content, a second framework content, or a second application content.

3. The method of claim 1, wherein the plurality of content comprises a base program, an update to the program, and a script for installing the program.

4. The method of claim 1, wherein loading the plurality of content comprises: defining a content view comprising the operating system content, the framework content, and the application content; and loading the content view into the environment.

5. The method of claim 1, further comprising: receiving a request to generate the snapshot of the environment.

6. A non-transitory computer-readable medium, comprising instructions encoded thereon which, when executed by a processing device, cause the processing device to:

receive a selection of an operating system content from one or more operating system contents from a user via a web user interface;

receive a selection of a framework content from one or more framework contents;

receive a selection of an application content from one or more applications;

load a plurality of content into an environment, wherein the plurality of content comprises the operating system content, the framework content, and the application content, wherein a server of a configuration management system comprising the environment, one or more client machines assigned to the environment, and each of the plurality of content comprising a binary of an operating system component and a script for installing the operating system component onto at least one of the one or more client machines assigned to the environment;

generate a snapshot of the environment in response to loading the plurality of content into the environment;

store the snapshot in a snapshot library;

provide, by the processing device, access to the snapshot library;

receive a selection of the snapshot from a plurality of snapshots of the snapshot library; and in response to receiving the selection, perform a test of the environment using the operating system component in view of the selected snapshot.

7. The non-transitory computer-readable medium of claim 6, wherein the plurality of content comprises at least one of a second operating system content, a second framework content, or second application content.

8. The non-transitory computer-readable medium of claim 6, wherein the plurality of content comprises a base program, an update to the program, and a script for installing the program.

9. The non-transitory computer-readable medium of claim 6, wherein the instructions encoded thereon which, when executed by the processing device, cause the processing device to load the plurality of content into the environment, comprise instructions encoded thereon which, when executed by the processing device, cause the processing device to: define a content view comprising the operating system content, the framework content, and the application content; and load the content view into the environment.

10. The non-transitory computer-readable medium of claim 6, further comprising instructions encoded thereon which, when executed by the processing device, cause the processing device to: receive a request to generate the snapshot.

11. An apparatus, comprising:

memory;

a network interface; and a processing device coupled to the memory and the network interface, the processing device to:

receive a selection of an operating system content from one or more operating system contents from a user via a web user interface;

receive a selection of a framework content from one or more framework contents;

receive a selection of an application content from one or more applications;

load a plurality of content into an environment, wherein plurality of content comprises the operating system content, the framework content, and the application content, wherein a server of a configuration management system comprising the environment, one or more client machines assigned to the environment, and each of the plurality of content comprising a binary of an operating system component and a script for installing the operating system component onto at least one of the one or more client machines assigned to the environment;

generate a snapshot of the environment in response to loading the plurality of content into the environment;

store the snapshot in a snapshot library of the memory;

provide access to the snapshot library via the network interface;

receive a selection of the snapshot from a plurality of snapshots of the snapshot library; and in response to receiving the selection, perform a test of the environment using the operating system component in view of the selected snapshot.

12. The apparatus of claim 11, wherein at least one of the plurality of content comprises at least one of a second operating system content, a second framework content, or a second application content.

13. The apparatus of claim 11, wherein at least one of the plurality of content comprises a base program, an update to the program, and a script for installing the program.

14. The apparatus of claim 11, wherein the processing device to load the plurality of content into the environment comprises the one or more processing device to: define a content view comprising the operating system content, the framework content, and the application content; and load the content view into the environment.

15. The apparatus of claim 11, wherein the processing device is further to:
receive a request to generate the snapshot.

* * * * *